(12) United States Patent  
Zhu et al.

(10) Patent No.: US 12,270,669 B1
(45) Date of Patent: Apr. 8, 2025

(54) TEST ROUTES PLANNING METHOD AND APPARATUS OF VEHICLE ON ACTUAL ROADS, MEDIUM AND DEVICE THEREOF

(71) Applicants: CHINA AUTOMOTIVE TECHNOLOGY AND RESEARCH CENTER CO., LTD, Tianjin (CN); CATARC AUTOMOTIVE TEST CENTER (TIANJIN) CO., LTD, Tianjin (CN)

(72) Inventors: Xianglei Zhu, Tianjin (CN); Yu Liu, Tianjin (CN); Yongkai Liang, Tianjin (CN); Hanzhengnan Yu, Tianjin (CN); Jingyuan Li, Tianjin (CN); Zhengjun Yang, Tianjin (CN); Xiaopan An, Tianjin (CN); Xi Hu, Tianjin (CN); Kunqi Ma, Tianjin (CN); Hang Xu, Tianjin (CN); Hao Zhang, Tianjin (CN); Enxing Zhang, Tianjin (CN)

(73) Assignees: CHINA AUTOMOTIVE TECHNOLOGY AND RESEARCH CENTER CO., LTD, Tianjin (CN); CATARC AUTOMOTIVE TEST CENTER (TIANJIN) CO, LTD, Tianjin (CN)

( * ) Notice: Subject to any disclaimer, the term of this patent is extended or adjusted under 35 U.S.C. 154(b) by 0 days.

(21) Appl. No.: 18/965,324

(22) Filed: Dec. 2, 2024

(30) Foreign Application Priority Data

Apr. 1, 2024 (CN) .......................... 202410382264.1

(51) Int. Cl.
*G01C 21/34* (2006.01)
*G07C 5/02* (2006.01)

(52) U.S. Cl.
CPC ........... *G01C 21/3492* (2013.01); *G07C 5/02* (2013.01)

(58) Field of Classification Search
CPC .............................. G01C 21/3492; G07C 5/02
See application file for complete search history.

(56) References Cited

U.S. PATENT DOCUMENTS

| 2005/0209770 | A1* | 9/2005 | O'Neill | G08B 27/001 |
|---|---|---|---|---|
| | | | | 701/411 |
| 2005/0267651 | A1* | 12/2005 | Arango | G08G 1/205 |
| | | | | 701/3 |

(Continued)

FOREIGN PATENT DOCUMENTS

| CN | 112729863 A | 4/2021 |
|---|---|---|
| CN | 113935441 A | 1/2022 |

(Continued)

*Primary Examiner* — Behrang Badii

(57) ABSTRACT

Disclosed are a test routes planning method and apparatus of a vehicle on actual roads, a medium and a device. The method includes the following steps: dividing road traffic scenes; calculating traffic scene characteristics based on the divided road traffic scenes; constructing a preliminary road selection database for test routes; and completing a planning of the test routes of the vehicle on the actual roads at different speeds in different traffic scenes by leveraging a genetic algorithm based on the preliminary road selection database for the test routes. The present disclosure provides a solution for planning the test routes of the vehicle on the actual roads. In the solution, the travel speed distribution of a user is obtained through calculation based on traffic flow big data, and the planning of the test routes on the actual roads in different traffic scenes is completed by leveraging the genetic algorithm.

9 Claims, 6 Drawing Sheets

(56) References Cited

U.S. PATENT DOCUMENTS

2013/0345955 A1* 12/2013 Tashiro .................... G08G 1/00
 701/118
2021/0312818 A1* 10/2021 Kadavil ................... G08G 5/32
2023/0050192 A1*  2/2023 Quirynen ............. G08G 1/0112

FOREIGN PATENT DOCUMENTS

| CN | 114739692 | A  | 7/2022  |
| CN | 115031988 | A  | 9/2022  |
| WO | 2019225497 | A1 | 11/2019 |
| WO | 2020156845 | A1 | 8/2020  |
| WO | 2020224462 | A1 | 11/2020 |

* cited by examiner

TEST ROUTES PLANNING METHOD AND APPARATUS OF VEHICLE ON ACTUAL ROADS, MEDIUM AND DEVICE THEREOF

CROSS-REFERENCE TO RELATED APPLICATION

This application claims priority from the Chinese patent application 2024103822641 filed Apr. 1, 2024, the content of which is incorporated herein in the entirety by reference.

TECHNICAL FIELD

The present disclosure relates to the technical field of transportation, in particular to a test routes planning method and apparatus of a vehicle on actual roads, a medium and a device thereof.

BACKGROUND ART

Tests of vehicles on actual roads have key significance for reliability and adaptability tests of the vehicles, and test route planning is the foundation of the tests on the actual roads. Currently, methods for planning the test routes mainly adopted by vehicle enterprises include two methods of free driving and hot spot road tracking: the free driving method refers to a random driving method without specifying specific routes, is used for simulating the actual driving scenes of users, and can hardly ensure the coverage of typical urban roads and traffic conditions due to high randomness; and the hot spot road tracking method refers to a method for obtaining the test routes by connecting hot spot areas with larger traffic flow in each urban area, and because traffic in the hot spot areas usually presents a congestion state, the mean vehicle speed of the test routes planned by the method is lower, significantly deviating from that in actual conditions.

In summary, there is an urgent need within the industry to improve the method for planning the test routes of the vehicles on the actual roads in the prior art, making the planned test routes better align with the actual travel speed distribution of the users.

SUMMARY OF THE DISCLOSURE

The present disclosure aims to provide a test routes planning method of a vehicle on actual roads, an apparatus, a medium and a device, and aims to plan the test routes that better align with the actual travel speed distribution of user travel, so that key indexes such as performance, durability and fuel consumption of the vehicle are evaluated more accurately.

In order to fulfill the objective of the present disclosure, a first aspect of an embodiment of the present disclosure provides a test routes planning method of a vehicle on actual roads, including the steps of:

step 1: dividing road traffic scenes;

step 2: calculating traffic scene characteristics based on the divided road traffic scenes to derive a vehicle kilometers traveled (VKT) distribution and a mean speed at different speeds in different traffic scenes;

step 3: constructing a preliminary road selection database for test routes based on the VKT distribution and the mean speed at different speeds in different traffic scenes, as derived in step 2; and step 4: completing a planning of the test routes of the vehicle on the actual roads in different traffic scenes by leveraging a genetic algorithm based on the preliminary road selection database for the test routes.

Corresponding to the first aspect, a second aspect of the embodiment provides a test routes planning apparatus of a vehicle on actual roads, including: a road traffic scene division unit, a traffic scene characteristic calculation unit, a construction unit for a preliminary road selection database for test routes, and a test route planning unit;

the road traffic scene division unit is configured to divide road traffic scenes;

the traffic scene characteristic calculation unit is configured to calculate traffic scene characteristics based on the divided road traffic scenes to derive a VKT distribution and a mean speed at different speeds in different traffic scenes;

the construction unit for the preliminary road selection database for the test routes is configured to construct the preliminary road selection database for the test routes based on the VKT distribution and the mean speed at different speeds in different traffic scenes; and the test route planning unit is configured to complete a planning of the test routes of the vehicle on the actual roads at different speeds in different traffic scenes by leveraging a genetic algorithm based on the preliminary road selection database for the test routes.

A third aspect of the embodiment provides a computer readable storage medium, wherein computer programs are stored on the computer readable storage medium, and when the computer programs are executed by a processor, steps of the test routes planning method of the vehicle on the actual roads are implemented.

A fourth aspect of the embodiment provides an electronic device, including a memory and a processor, wherein computer programs are stored on the memory, and the processor, when executing the computer programs, implements steps of the test routes planning method of the vehicle on the actual roads.

Compared with the prior art, the present disclosure has the following beneficial effects:

The present disclosure provides a solution for planning the test routes of the vehicle on the actual roads. In the solution, the travel speed distribution of the user is obtained through calculation based on traffic flow big data, and the planning of the test routes on the actual roads in different traffic scenes is completed by leveraging the genetic algorithm, so that the test routes can cover the travel speed distribution characteristics of the user at different times and across different areas. According to the method, the representativeness and coverage of actual road tests can be improved, making the actual road tests closer to actual usage scenes.

DETAILED DESCRIPTION OF THE EMBODIMENTS

The present disclosure will be further stated in detail with reference to accompanying drawings and specific embodiments below. It should be understood that the specific embodiments described herein are only for explaining the present disclosure, but are not for limiting the present disclosure.

Embodiment 1

Figure 1:
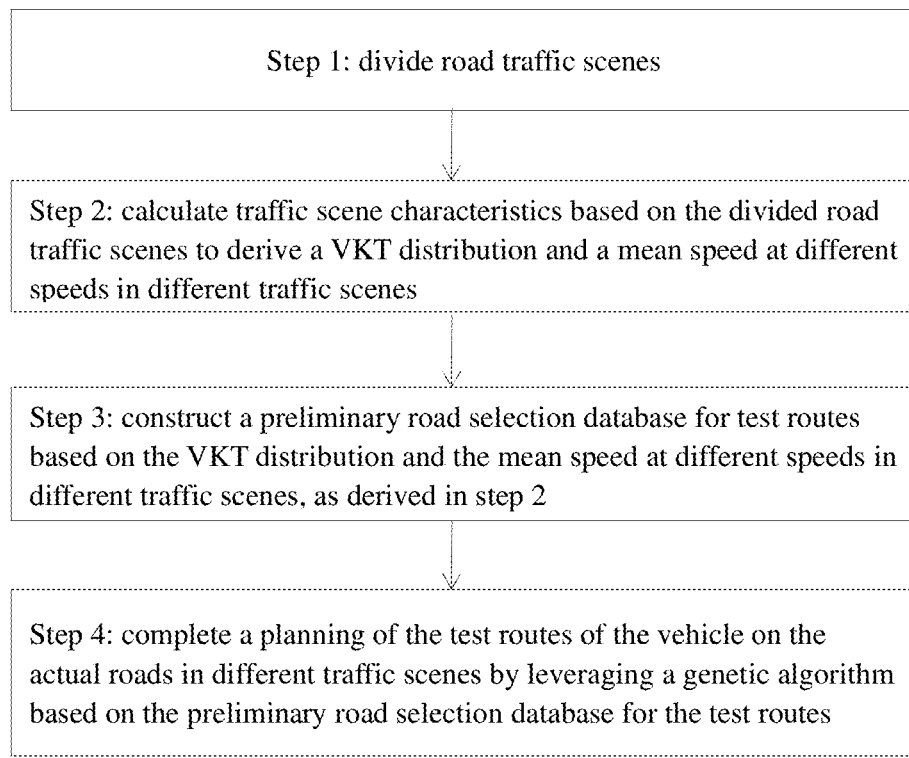
FIG. 1 is a flowchart illustrating a test routes planning method provided by an embodiment of the present application.

As shown in FIG. 1, the embodiment provides a test routes planning method of a vehicle on actual roads, including the following steps:

Step 1: a road traffic scene is divided.

Specifically, the road traffic scene may be divided into urban and suburban areas according to areas encompassing the roads, and divided into five time periods: a morning peak, a morning off-peak, an afternoon off-peak, an evening peak and an evening off-peak according to time periods.

With Xi'an City as an application example, the morning peak may be selected to be 7:00-9:00, the morning off-peak may be selected to be 9:00-12:00, the afternoon off-peak may be selected to be 14:00-17:00, the evening peak may be selected to be 17:00-19:00, and the evening off-peak may be selected to be 19:00-21:00.

Step 2: traffic scene characteristics are calculated based on the divided road traffic scenes to derive a VKT distribution and a mean speed at different speeds in different traffic scenes.

Specifically, the calculating traffic scene characteristics are as follows: based on the divided different traffic scenes, a VKT of each road is calculated by using a speed-flow model in a classical traffic flow model based on traffic flow data, wherein a calculation formula of the VKT is shown in a formula (1).

$$VKT = WQ \times L \quad (1)$$

Where, L denotes a road length, and WQ denotes a road flow.

Finally, the VKT distribution (namely the speed-VKT distribution, with a speed interval of 5 km/h) and the mean speed at different speeds in different traffic scenes may be obtained by calculating VKT values of the roads in the corresponding time periods in different traffic scenes.

The mean speed of the roads in the urban areas of Xi'an City during the morning peak is 18.67 km/h.

Step 3: a preliminary road selection database for test routes is constructed based on the VKT distribution and the mean speed at different speeds in different traffic scenes, as derived in step 2.

Before the planning of the test routes on the actual roads is performed, key roads that may adequately represent user travel while having speed stability and general roads for connecting the key roads need to be pre-selected.

Figure 2:
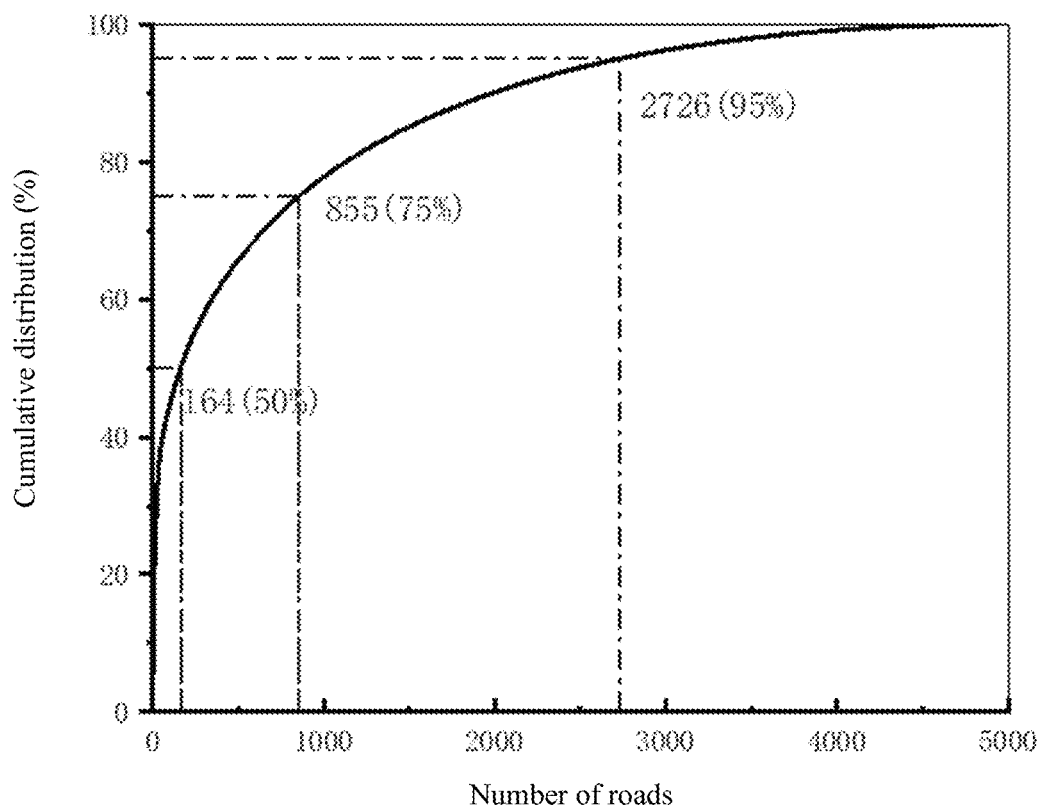
FIG. 2 is a cumulative VKT distribution map of roads in urban areas in an application example of the present application.

Specifically, the step of constructing a preliminary road selection database for test routes includes constructing a preliminary road selection database for urban areas and a preliminary road selection database for suburban areas.

Wherein the step of constructing a preliminary road selection database for urban areas is specifically as follows:

step 3.11: a general road database is constructed by the following specific method: selecting roads within the urban areas, arranging the roads in a descending order based on VKT values, calculating a cumulative VKT distribution map for the roads within the urban areas, and selecting urban roads with the VKT values in the top 75% of the cumulative distribution map to serve as general roads in the roads within the urban areas;

wherein the cumulative VKT distribution of the roads within the urban areas of Xi'an City is shown in FIG. 2.

Step 3.12: a key road database is constructed by the following specific method: screening out urban roads with the VKT values in the top 50% of the cumulative distribution map from the general roads to serve as key roads selected from the roads within the urban areas, wherein a standard deviation of the speeds of the roads screened out is less than 5 km/h during a corresponding time period on a working day.

Wherein the constructing a preliminary road selection database for suburban areas is specifically as follows:

step 3.21: a total amount of VKT values within different administrative areas is calculated, and a suburban area ranked first is selected;

wherein the VKT rank of each suburban area of Xi'an City during the morning peak is shown in Table 1, and Chang'an District is selected as a subsequent suburban test route planning area during the morning peak.

TABLE 1

| Rank | Area |
| --- | --- |
| 1 | Chang'an District |
| 2 | Lintong District |
| 3 | Huyi District |
| 4 | Gaoling District |
| 5 | Lantian County |
| 6 | Yanliang District |
| 7 | Zhouzhi County |

Step 3.22: a general road database is constructed by the following specific method: selecting roads within the corresponding administrative area, arranging the roads in a descending order based on the VKT values, calculating a cumulative VKT distribution map for the roads within the administrative area, and selecting suburban roads with the VKT values in the top 75% of the cumulative distribution map to serve as general roads within the suburban areas; and step 3.23: a key road database is constructed by the following specific method: screening out urban roads with the VKT values in the top 50% of the cumulative distribution map from the general roads to serve as key roads selected from the roads within the suburban areas, wherein a standard deviation of the speeds of the selected roads is less than 5 km/h during a corresponding time period on a working day.

Step 4: a planning of the test routes of the vehicle on the actual roads at different speeds in different traffic scenes is completed by leveraging a genetic algorithm based on the preliminary road selection database for the test routes.

Figure 3:
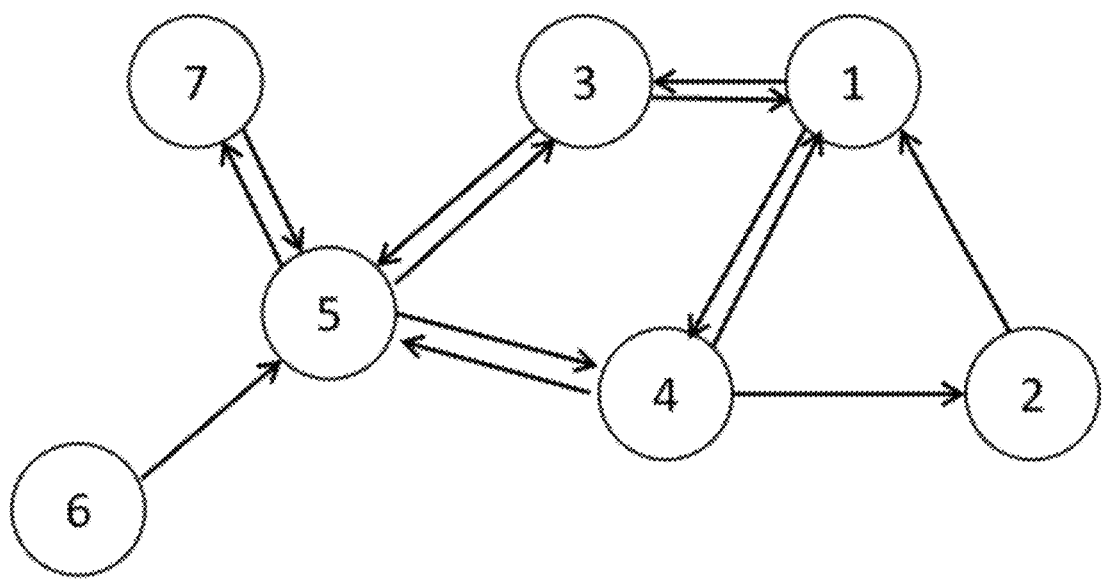
FIG. 3 is a structural schematic diagram illustrating a road map according to an embodiment of the present application.

The step 4 specifically includes:

step 4.1: based on the preliminary road selection database for the test routes, the roads in the preliminary road selection database for the test routes are represented using a graph structure;

wherein, in the graph structure, each node represents an endpoint of each road, and a connecting line between two nodes represents a road segment. A schematic diagram of a road map structure is shown in FIG. 3.

Step 4.2: a test route planning objective function and a test route planning constraint function are constructed, wherein $x_{i,j}$ denotes a selection condition of the roads from a node i to a node j for vehicle travel.

The road planning objective is to obtain a road with a large key road proportion and a small speed distribution error sum, so that the test route planning objective function aims to minimize a product of a reciprocal of a proportion of key road lengths in the test routes and a speed distribution error sum. An expression of the objective function is as follows.

$$\text{Min}\left(\frac{\sum_{i=0}^{n}\sum_{j=1}^{n}d_{i,j}\times x_{i,j}}{\sum_{i=0}^{n}\sum_{j=1}^{n}d_{i,j}\times x_{i,j}\times IR_{i,j}}\times \sum\left(\left|\frac{\sum_{i=0}^{n}\sum_{j=1}^{n}v_{i,j}\times d_{i,j}\times x_{i,j}}{\sum_{i=0}^{n}\sum_{j=1}^{n}d_{i,j}\times x_{i,j}}-V\right|\right)\right) \quad (2)$$

Where $v_{i,j}$ denotes a speed-VKT distribution of a road i, j; V denotes a speed-VKT distribution in the traffic scene; n denotes the quantity of the roads; $d_{i,j}$ denotes a distance from the node i to the node j for vehicle travel along the road i, j; $IR_{i,j}$ denotes whether the road i, j is the key road, if yes, $IR_{i,j}$ is set to 1, or else, $IR_{i,j}$ is set to 0; and $x_{i,j}$ denotes the selection condition of the roads from the node i to the node j for vehicle travel, if the road is selected, $x_{i,j}$ is set to 1, or else, $x_{i,j}$ is set to 0.

Additionally, the planned test routes should meet the following constraint conditions:

(1) a distance of the test route needs to have a margin of error within 10% relative to a target distance of the traffic scene, and a corresponding constraint function is as follows:

$$l = \bar{v}\times t \quad (3)$$

$$\sum_{i=0}^{n}\sum_{j=1}^{n}d_{i,j}\times x_{i,j} < l\times 1.1 \quad (4)$$

$$\sum_{i=0}^{n}\sum_{j=1}^{n}d_{i,j}\times x_{i,j} > 0.9\times l \quad (5)$$

Where l denotes the target distance of the traffic scene; $\bar{v}$ denotes a mean road speed in the traffic scene, and t denotes a time frame length in the traffic scene.

(2) Each road is traversed at most once in each direction, without repetition. A corresponding constraint function is as follows:

$$x_{i,j}\in\{0,1\}\times k_{i,j}, \forall i\in\{1,2,\ldots,n\}, \forall j\in\{1,2,\ldots,n\} \quad (6)$$

Where $k_{i,j}$ denotes whether there is a road connection between the road nodes i and j and whether a lane direction is from the node i to the node j, if the road connection exists, $k_{i,j}$ is set to 1, or else, $k_{i,j}$ is set to 0.

(3) The selected roads must be able to be connected into a path, i.e., it is ensured that the roads have only one origin node and one destination node, the rest being intermediate nodes. Wherein it should be ensured that the quantity of roads arriving at the origin node—the quantity of roads departing from the origin node=−1, it should be ensured that the quantity of the roads arriving at the destination node—the quantity of the roads departing from the destination node=1, and it should be ensured that the quantity of the roads arriving at the intermediate node—the quantity of the roads departing from the intermediate node=0. A corresponding constraint function is as follows:

$$\sum_{i=1}^{n}x_{i,j}-\sum_{i=1}^{n}x_{j,i}=-1, \exists\,!\,j\in\{1,2,\ldots,n\} \quad (7)$$

$$\sum_{i=1}^{n}x_{i,j}-\sum_{i=1}^{n}x_{j,i}=1, \exists\,!\,j\in\{1,2,\ldots,n\}$$

$$\sum_{i=1}^{n}x_{i,j}-\sum_{i=1}^{n}x_{j,i}\in\{-1,0,1\}, \forall\,j\in\{1,2,\ldots,n\}$$

Where $x_{j,i}$ denotes the selection condition of the roads from the node j to the node i for vehicle travel.

Step 4.3: the variable $x_{i,j}$ is solved by the genetic algorithm.

Specifically, it includes the following steps:

4.3.1 Genetic algorithm coding: an initial population required by the genetic algorithm is generated and binary coding is performed, i.e., coding the variable (i.e., $x_{i,j}$) for the problem into a format that is available to be processed by the genetic algorithm. Each gene $x_{i,j}$ represents the selection condition of the roads from the node i to the node j for vehicle travel, if the road is selected, $x_{i,j}$ is set to 1, or else, $x_{i,j}$ is set to 0.

4.3.2 Solving by the genetic algorithm: a genetic operation is repeatedly carried out on individuals in the initial population by using three operators, namely a selection operation, a crossover operation and a mutation operation, of the genetic operation, better individuals are obtained through calculation of a fitness function, and the better individuals are saved from generation to generation, wherein the fitness function is shown in a formula 8. When the number of iterations reaches the preset maximum number of iterations or the fitness function remains unchanged for multiple consecutive generations, it is considered that the genetic algorithm has found the optimal solution of the test routes, and the iteration of the genetic algorithm ends.

$$f=\frac{\sum_{i=0}^{n}\sum_{j=1}^{n}d_{i,j}\times x_{i,j}}{\sum_{i=0}^{n}\sum_{j=1}^{n}d_{i,j}\times x_{i,j}\times IR_{i,j}}\times \sum\left(\left|\frac{\sum_{i=0}^{n}\sum_{j=1}^{n}v_{i,j}\times d_{i,j}\times x_{i,j}}{\sum_{i=0}^{n}\sum_{j=1}^{n}d_{i,j}\times x_{i,j}}-V_{i,j}\right|\right) \quad (8)$$

Step 4.4: firstly, an individual is selected from a population with a minimum fitness function, a specific variable with a value equal to 1 is extracted from the variable $x_{i,j}$, and then roads corresponding to the specific variables are combined into a road path based on a node connection relation in a road sequence, so as to obtain the test routes of the vehicle on the actual roads in the corresponding scenes. Subsequently, the test routes in different traffic scenes are respectively calculated using the above-mentioned calculation method, and finally 10 total test routes in different areas (urban and suburban areas) and different time periods (morning peak, morning off-peak, afternoon off-peak, evening peak and evening off-peak) are obtained.

Figure 4:
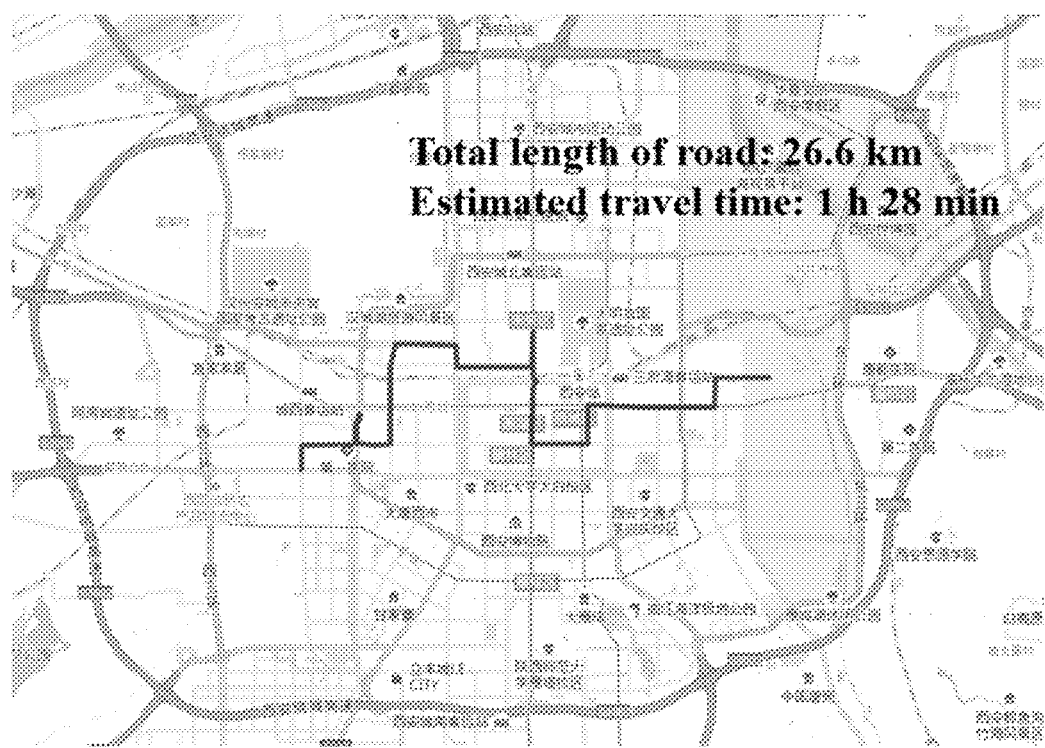
FIG. 4 is a test route map of urban areas of Xi'an City during a morning peak according to an application example of the present application.
Figure 5:
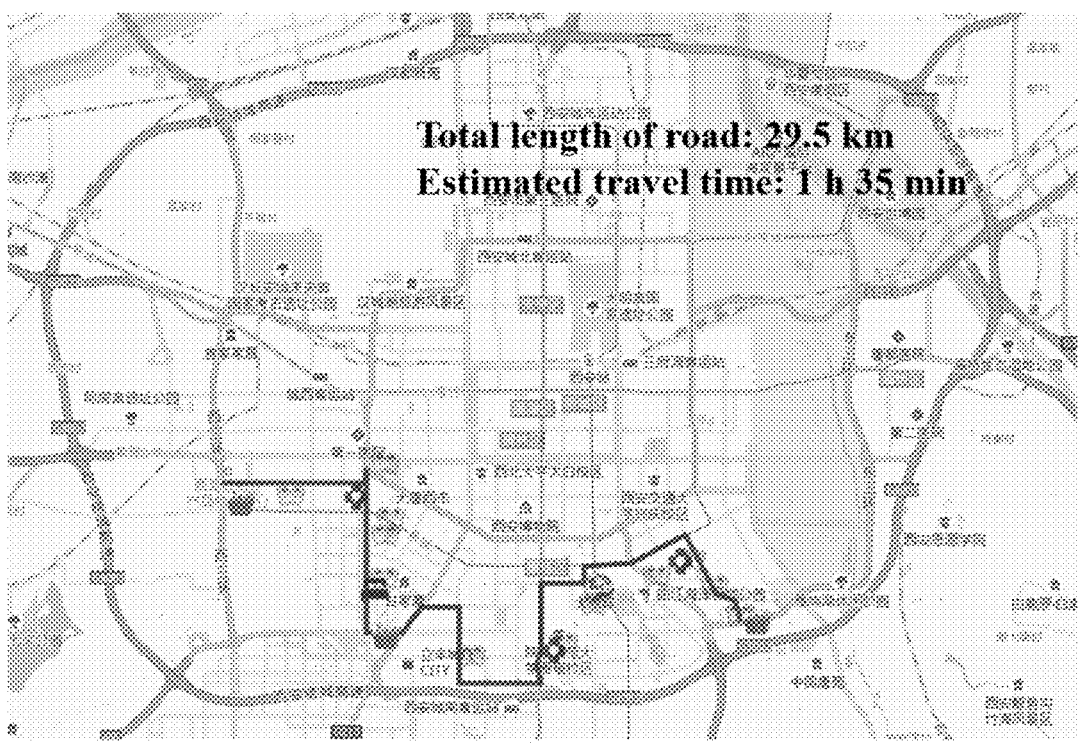
FIG. 5 is a test route map of suburban areas of Xi'an City during a morning peak according to an application example of the present application.
Figure 6:
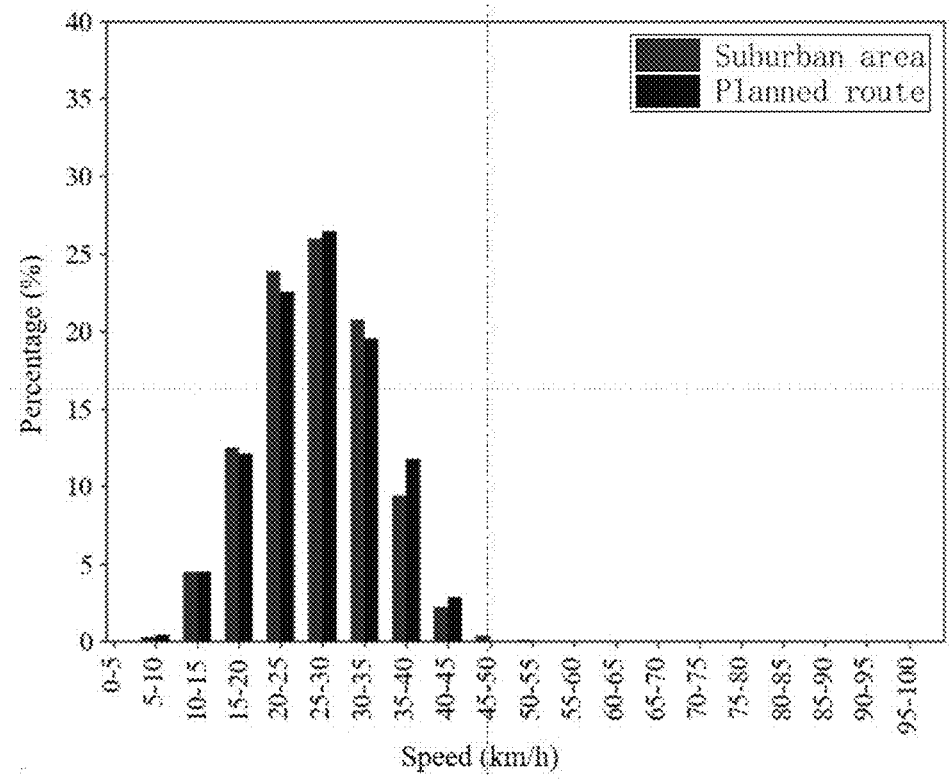
FIG. 6 is a comparative diagram illustrating VKTs in urban areas of Xi'an City during a morning peak according to an application example of the present application.
Figure 7:
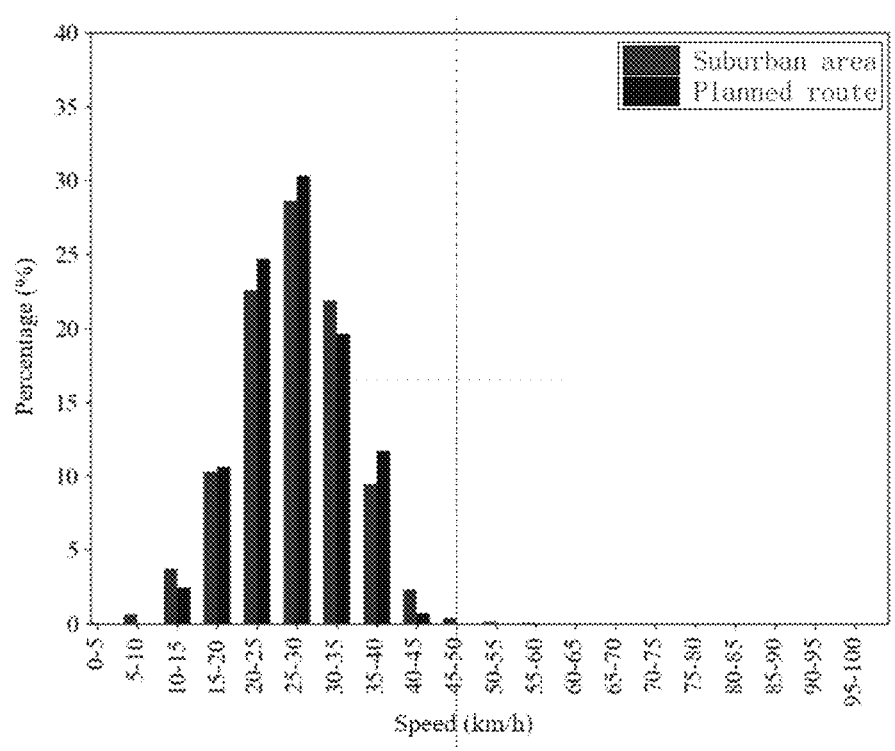
FIG. 7 is a comparative diagram illustrating VKTs in suburban areas of Xi'an City during a morning peak according to an application example of the present application.

The test routes of the urban and suburban areas of Xi'an City during the morning peak are shown in FIG. 4 and FIG. 5, with the comparison of the speed-VKT of both shown in FIG. 6 and FIG. 7.

Embodiment 2

Corresponding to the above method, the embodiment provides a test routes planning apparatus of a vehicle on actual roads, including the following units: a road traffic scene division unit, a traffic scene characteristic calculation unit, a construction unit for a preliminary road selection database for test routes, and a test route planning unit;

the road traffic scene division unit is configured to divide road traffic scenes;

the traffic scene characteristic calculation unit is configured to calculate traffic scene characteristics based on the divided road traffic scenes to derive a VKT distribution and a mean speed at different speeds in different traffic scenes;

the construction unit for the preliminary road selection database for the test routes is configured to construct the preliminary road selection database for the test routes based on the VKT distribution and the mean speed at different speeds in different traffic scenes; and the test route planning unit is configured to complete a planning of the test routes of the vehicle on the actual roads at different speeds in different traffic scenes by leveraging a genetic algorithm based on the preliminary road selection database for the test routes.

It should be noted that, in this embodiment, other related solutions refer to the description of Embodiment 1, and are not repeated here.

Embodiment 3

The embodiment provides a computer readable storage medium, wherein computer programs are stored on the computer readable storage medium, and when the computer programs are executed by a processor, steps of the test routes planning method of the vehicle on the actual roads are implemented.

For other contents in this embodiment, reference may be made to the contents of Embodiment 1 in detail, and details are not repeated here.

Embodiment 4

The embodiment provides an electronic device, including a memory and a processor, wherein computer programs are stored on the memory, and the processor, when executing the computer programs, implements steps of the test routes planning method of the vehicle on the actual roads.

For other contents in this embodiment, reference may be made to the contents of Embodiment 1 in detail, and details are not repeated here.

For convenience of description, when the above devices are described, it is made for various modules in terms of functions. Of course, when this disclosure is implemented, the functions of each module can be implemented in one or more pieces of software and/or hardware.

The device in the above embodiments is used to implement the corresponding method of the test routes planning in any of the above embodiments, and present beneficial effects of the corresponding method embodiments, which will not be described in detail here.

On a basis of the same concept, corresponding to the method of any of the above embodiments, an electronic device is also provided in this disclosure, which includes a memory, a processor and a computer program stored on the memory and operable on the processor, and the processor implements the scheduling method for the unrelated parallel machine described in any one of the above embodiments when executing the program.

Figure 8:
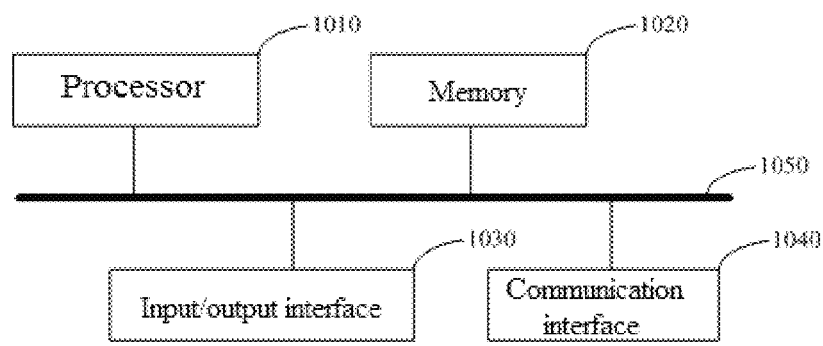
FIG. 8 is a schematic structural diagram of an electronic device according to an embodiment of the present disclosure.

FIG. 8 shows a more specific hardware structure diagram of an electronic device provided in this embodiment, which may include a processor 1010, a memory 1020, an input/output interface 1030, a communication interface 1040 and a bus 1050. A communication connection with each other is realized among the processor 1010, the memory 1020, the input/output interface 1030 and the communication interface 1040 in the device through the bus 1050.

The processor 1010 can be implemented by a general-purpose CPU (Central Processing Unit), a microprocessor, an application specific integrated circuit (ASIC), or one or more integrated circuits, etc., and is used for executing relevant programs to realize technical schemes provided in the embodiments of this specification.

The memory 1020 can be implemented in a form of ROM (Read Only Memory), RAM (Random Access Memory), static storage device, dynamic storage device, or the like. The memory 1020 can store the operating system and other application programs. When the technical schemes provided in the embodiments of this specification is implemented by software or firmware, relevant program codes are stored in the memory 1020 and called and executed by the processor 1010.

The input/output interface 1030 is used to connect the input/output module to realize information input and output. The input/output module can be configured as a component in the device (not shown in the figure), or it can be externally connected to the device to provide corresponding functions. An input device can include a keyboard, a mouse, a touch screen, a microphone and various sensors, and an output device can include a display, a speaker, a vibrator and an indicator.

The communication interface 1040 is used to connect with a communication module (not shown in the figure) to realize communication interaction between the device and other devices. The communication module can communicate by wired means (such as USB, network cable, etc.) or by wireless means (such as mobile network, WIFI, Bluetooth, etc.).

The bus 1050 includes a path for transmitting information among various components of the device, such as the processor 1010, the memory 1020, the input/output interface 1030 and the communication interface 1040.

It should be noted that although the above device only shows the processor 1010, the memory 1020, the input/output interface 1030, the communication interface 1040 and the bus 1050, in the specific implementation process, the device may also include other components necessary for normal operation. In addition, it can be understood by those skilled in the art that the above-mentioned device may only contain the components necessary for implementing the embodiments of this specification, and need not contain all the components shown in the drawings.

Figure 9:
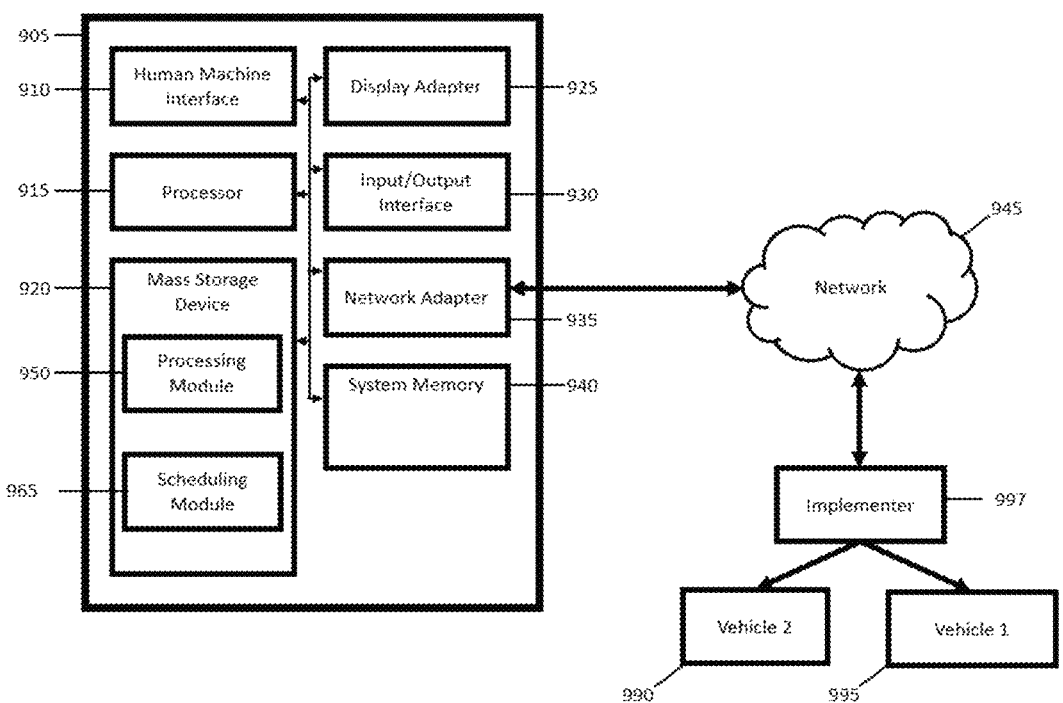
FIG. 9 is a block diagram illustrating an exemplary computing system in which the present system and method can operate according to an embodiment of the present disclosure.

Referring to FIG. 9, the methods and systems of the present disclosure may be implemented on one or more computers, such as computer 905. The methods and systems disclosed may utilize one or more computers to perform one or more functions in one or more locations. The processing of the disclosed methods and systems may also be performed by software components. The disclosed systems and methods may be described in the general context of computer-executable instructions such as program modules, being executed by one or more computers or devices. For example, the program modules include operating modules such as Processing Module 950, Scheduling Module 965, and the like.

Processing Module 950 may be configured to calculate traffic scene characteristics based on divided road traffic scenes to derive a vehicle kilo-meters travelled distribution and a mean speed at different speed in different traffic scenes.

Scheduling Module 965 may be configured to constructing a test route planning objective function and a test route planning constraints function, and complete a planning of the test routes of the vehicle.

These program modules may be stored on mass storage device 920 of one or more computers devices, and may be executed by one or more processors, such as processor 915. Each of the operating modules may comprise elements of programming and data management software.

The components of the one or more computers may comprise, but are not limited to, one or more processors or processing units, such as processor 915, system memory 940, mass storage device 920, Input/Output Interface 930, display adapter 925, network adaptor 935, and a system bus that couples various system components. The one or more computers and implementer 997 may be implemented over a wired or wireless network connection at physically separate locations, implementing a fully distributed system. Additionally, implementer 997 may include the one or more computers such that implementer 997 and the one or more computers may be implemented in a same physical location. By way of example, without limitation, the one or more computers may be a personal computer, a portable computer, a smart device, a network computer, a peer device, or other common network node, and so on. Logical connections between one or more computers and implementer 997 may be made via network 945, such as a local area network (LAN) and/or a general wide area network (WAN).

Implementer 997 may be, for example, without limitation, a global positioning system (GPS) or camera or a sensor configured to obtain the traffic scene of vehicles 1 and 2 990 and 995.

The apparatus may include additional components that perform each of the blocks of the algorithm in the aforementioned flowcharts of FIG. 1. As such, each block in the aforementioned flowcharts of FIG. 1 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

The foregoing details of the optional implementations of the embodiments of the present disclosure have been described in conjunction with the accompanying drawings, but the embodiments of the present disclosure are not limited to the specific details of the foregoing implementations, and various simple modifications may be made to the technical solutions of the embodiments of the present disclosure within the scope of the technical concepts of the embodiments of the present disclosure, and all the simple modifications fall within the scope of protection of the embodiments of the present disclosure.

What is claimed is:

1. A test routes planning method of a vehicle on actual roads, comprising the following steps:

step 1: obtain road traffic scenes via a global positioning system and dividing the road traffic scenes by a processor;

step 2: calculating traffic scene characteristics based on the divided road traffic scenes to derive a vehicle kilometers traveled distribution and a mean speed at different speeds in different traffic scenes by the processor;

step 3: constructing a preliminary road selection database for test routes based on the VKT distribution and the mean speed at different speeds in different traffic scenes, as derived in step 2 by the processor; and step 4: executed by the processor, based on the preliminary road selection database for the test routes, representing roads in the preliminary road selection database for the test routes using a graph structure, constructing a test route planning objective function and a test route planning constraint function, completing a planning of the test routes of the vehicle on the actual roads in different traffic scenes by leveraging a genetic algorithm; and outputting the planning of the test routes of the vehicle to a display;

the step 4 comprises:

step 4.1: based on the preliminary road selection database for the test routes, representing the roads in the preliminary road selection database for the test routes using the graph structure, wherein in the graph structure, each node represents an endpoint of each road, and a connecting line between two nodes represents a road segment;

step 4.2: constructing a test route planning objective function and a test route planning constraint function, wherein $x_{i,j}$ denotes a selection condition of the roads from a node i to a node i for vehicle travel;

wherein the test route planning objective function aims to minimize a product of a reciprocal of a proportion of key road lengths in the test routes and a speed distribution error sum, and an expression of the objective function is as follows:

(2)

wherein $v_{i,j}$ denotes a speed-VKT distribution of a road i, j; V denotes a speed-VKT distribution in the traffic scene; n denotes a quantity of the roads; $d_{i,j}$ denotes a distance from the node i to the node j for vehicle travel along the road i, j; $IR_{i,j}$ denotes whether the road i, j is the key road, if yes, $IR_{i,j}$ is set to 1, or else, $IR_{i,j}$ is set to 0; $x_{i,j}$ denotes the selection condition of the roads from the node i to the node j for vehicle travel, if the road is selected, $x_{i,j}$ is set to 1, or else, $x_{i,j}$ is set to 0;

wherein the planned test routes should meet following constraint conditions:

(1) a distance of the test route is required to have a margin of error within 10% relative to a target distance of the traffic scene, and a corresponding constraint function is as follows:

(3)
(4)
(5)

wherein l denotes the target distance of the traffic scene; denotes a mean road speed in the traffic scene, and t denotes a time frame length in the traffic scene;

(2) each road is traversed at most once in each direction, without repetition, and a corresponding constraint function is as follows:

(6)

wherein $k_{i,j}$ denotes whether there is a road connection between the road nodes i and j and whether a lane direction is from the node i to the node j, if the road connection exists, $k_{i,j}$ is set to 1, or else, $k_{i,j}$ is set to 0;

(3) the selected roads is capable of being connected into a path, i.e., the roads have only one origin node and one destination node, the rest being intermediate nodes, wherein a quantity of roads arriving at the origin node—a quantity of roads departing from the origin node=−1, a quantity of the roads arriving at the destination node—a quantity of the roads departing from the destination node=1, and a quantity of the roads arriving at the intermediate node—a quantity of the roads departing from the intermediate node=0, with a corresponding constraint function being as follows:

(7)

wherein $x_{j,i}$ denotes the selection condition of the roads from the node i to the node j for vehicle travel;

step 4.3: solving, by the genetic algorithm, the variable $x_{j,i}$;

specifically, it includes the following steps:

4.3.1 Genetic algorithm coding: an initial population required by the genetic algorithm is generated and binary coding is performed, i.e., coding the variable (i.e., $x_{i,j}$) for the problem into a format that is available to be processed by the genetic algorithm, Each gene $x_{i,j}$ represents the selection condition of the roads from the node i to the node j for vehicle travel, if the road is selected, $x_{i,j}$ is set to 1, or else, $x_{i,j}$ is set to 0;

4.3.2 Solving by the genetic algorithm: a genetic operation is repeatedly carried out on individuals in the initial population by using three operators, namely a selection operation, a crossover operation and a mutation operation, of the genetic operation, better individuals are obtained through calculation of a fitness function, and the better individuals are saved from generation to generation, wherein the fitness function is shown in a formula 8;

when the number of iterations reaches the preset maximum number of iterations or the fitness function remains unchanged for multiple consecutive generations, it is considered that the genetic algorithm has found the optimal solution of the test routes, and the iteration of the genetic algorithm ends;

(8)
and step 4.4: firstly, selecting an individual from a population with a minimum fitness function, extracting a specific variable with a value equal to 1 from the variable $x_{i,j}$, and then combining roads corresponding to the specific variables into a road path based on a connection relation in a road sequence, so as to obtain the test routes of the vehicle on the actual roads in the corresponding scenes.

2. The test routes planning method of the vehicle on the actual roads according to claim 1, wherein the step 1 comprises: dividing the traffic scenes into urban areas and suburban areas according to areas encompassing the roads; and dividing the traffic scene into five time periods: a morning peak, a morning off-peak, an afternoon off-peak, an evening peak and an evening off-peak according to time periods.

3. The test routes planning method of the vehicle on the actual roads according to claim 2, wherein the step 2 comprises: based on the divided different traffic scenes, calculating, by using a speed-flow model in a classical traffic flow model, a VKT of each road based on traffic flow data, wherein a calculation formula of the VKT is shown in a formula (1):

$$VKT = WQ \times L \quad (1)$$

wherein WQ is a road flow, and L is a road length; and calculating the VKT values of the roads in the corresponding time periods in different traffic scenes to obtain the VKT distribution and the mean speed at different speeds in different traffic scenes.

4. The test routes planning method of the vehicle on the actual roads according to claim 3, wherein in step 3, the constructing a preliminary road selection database for test routes comprises: constructing a preliminary road selection database for urban areas and constructing a preliminary road selection database for suburban areas.

5. The test routes planning method of the vehicle on the actual roads according to claim 4, wherein the constructing a preliminary road selection database for urban areas is specifically as follows:

step 3.11: constructing, by a following specific method, a general road database: selecting roads within the urban areas, arranging the roads in a descending order based on VKTs, calculating a cumulative VKT distribution map for the roads within the urban areas, and selecting urban roads with the VKTs in the top 75% of the cumulative distribution map to serve as general roads within the urban areas; and step 3.12: constructing, by a following specific method, a key road database: screening out urban roads with the VKTs in the top 50% of the cumulative distribution map from the general roads to serve as key roads selected from the roads within the urban areas, wherein a standard deviation of the speeds of the roads screened out is less than 5 km/h during a corresponding time period on a working day.

6. The test routes planning method of the vehicle on the actual roads according to claim 4, wherein the constructing a preliminary road selection database for suburban areas is specifically as follows:

step 3.21: calculating a total amount of VKTs within different administrative areas, and selecting a suburban area ranked first;

step 3.22: constructing, by a following specific method, a general road database: selecting roads within the corresponding administrative area, arranging the roads in a descending order based on the VKTs, calculating a cumulative VKT distribution map for the roads within the administrative area, and selecting suburban roads with the VKTs in the top 75% of the cumulative distribution map to serve as general roads of the roads within the suburban areas; and step 3.23: constructing, by a following specific method, a key road database: screening out urban roads with the VKTs in the top 50% of the cumulative distribution map from the general roads to serve as key roads selected from the roads within the suburban areas, wherein a standard deviation of the speeds of the selected roads is less than 5 km/h during a corresponding time period on a working day.

7. A test routes planning apparatus of a vehicle on actual roads, comprising following units: a road traffic scene division unit, a traffic scene characteristic calculation unit, a construction unit for a preliminary road selection database for test routes, and a test route planning unit; wherein the road traffic scene division unit is configured to divide road traffic scenes;

the traffic scene characteristic calculation unit is configured to calculate traffic scene characteristics based on the divided road traffic scenes to derive a VKT distribution and a mean speed at different speeds in different traffic scenes;

the construction unit for the preliminary road selection database for the test routes is configured to construct the preliminary road selection database for the test routes based on the VKT distribution and the mean speed at different speeds in different traffic scenes; and the test route planning unit is configured to complete a planning of the test routes of the vehicle on the actual roads at different speeds in different traffic scenes by leveraging a genetic algorithm based on the preliminary road selection database for the test routes; the unit is specifically configured to perform the following steps:

step 4.1: based on the preliminary road selection database for the test routes, representing the roads in the preliminary road selection database for the test routes using the graph structure, wherein in the graph structure, each node represents an endpoint of each road, and a connecting line between two nodes represents a road segment;

step 4.2: constructing a test route planning objective function and a test route planning constraint function, wherein $x_{i,j}$ denotes a selection condition of the roads from a node i to a node j for vehicle travel;

wherein the test route planning objective function aims to minimize a product of a reciprocal of a proportion of key road lengths in the test routes and a speed distribution error sum, and an expression of the objective function is as follows:

(2)

wherein $v_{i,j}$ denotes a speed-VKT distribution of a road i, j; V denotes a speed-VKT distribution in the traffic scene; n denotes a quantity of the roads; $d_{i,j}$ denotes a distance from the node i to the node j for vehicle travel along the road i, j; $IR_{i,j}$ denotes whether the road i, j is the key road, if yes, $IR_{i,j}$ is set to 1, or else, $IR_{i,j}$ is set to 0; $x_{i,j}$ denotes the selection condition of the roads from the node i to the node j for vehicle travel, if the road is selected, $x_{i,j}$ is set to 1, or else, $x_{i,j}$ is set to 0;

wherein the planned test routes should meet following constraint conditions:

(1) a distance of the test route is required to have a margin of error within 10% relative to a target distance of the traffic scene, and a corresponding constraint function is as follows:
(3)
(4)
(5)

wherein l denotes the target distance of the traffic scene; denotes a mean road speed in the traffic scene, and t denotes a time frame length in the traffic scene;

(2) each road is traversed at most once in each direction, without repetition, and a corresponding constraint function is as follows:
(6)

wherein $k_{i,j}$ denotes whether there is a road connection between the road nodes i and j and whether a lane direction is from the node i to the node j, if the road connection exists, $k_{i,j}$ is set to 1, or else, $k_{i,j}$ is set to 0;

(3) the selected roads is capable of being connected into a path, i.e., the roads have only one origin node and one destination node, the rest being intermediate nodes, wherein a quantity of roads arriving at the origin node—a quantity of roads departing from the origin node=−1, a quantity of the roads arriving at the destination node—a quantity of the roads departing from the destination node=1, and a quantity of the roads arriving at the intermediate node—a quantity of the roads departing from the intermediate node=0, with a corresponding constraint function being as follows:
(7)

wherein $x_{j,i}$ denotes the selection condition of the roads from the node j to the node i for vehicle travel;

step 4.3: solving, by the genetic algorithm, the variable $x_{j,i}$;

specifically, it includes the following steps:

4.3.1 genetic algorithm coding: an initial population required by the genetic algorithm is generated and binary coding is performed, i.e., coding the variable (i.e., $x_{i,j}$) for the problem into a format that is available to be processed by the genetic algorithm, Each gene $x_{i,j}$ represents the selection condition of the roads from the node i to the node j for vehicle travel, if the road is selected, $x_{i,j}$ is set to 1, or else, $x_{i,j}$ is set to 0;

4.3.2 solving by the genetic algorithm: a genetic operation is repeatedly carried out on individuals in the initial population by using three operators, namely a selection operation, a crossover operation and a mutation operation, of the genetic operation, better individuals are obtained through calculation of a fitness function, and the better individuals are saved from generation to generation, wherein the fitness function is shown in a formula 8, When the number of iterations reaches the preset maximum number of iterations or the fitness function remains unchanged for multiple consecutive generations, it is considered that the genetic algorithm has found the optimal solution of the test routes, and the iteration of the genetic algorithm ends;
(8)
and step 4.4: firstly, selecting an individual from a population with a minimum fitness function, extracting a specific variable with a value equal to 1 from the variable $x_{i,j}$, and then combining roads corresponding to the specific variables into a road path based on a connection relation in a road sequence, so as to obtain the test routes of the vehicle on the actual roads in the corresponding scenes.

8. A non-transitory computer readable storage medium, wherein computer programs are stored on the storage medium, and when the computer programs are executed by a processor, steps of the test routes planning method of the vehicle on the actual roads as claimed in claim 1 are implemented.

9. An electronic device, comprising a memory and a processor, computer programs being stored on the memory, wherein the processor, when executing the computer programs, is configured to implement steps of the test routes planning method of the vehicle on the actual roads as claimed in claim 1.

\* \* \* \* \*